UNITED STATES PATENT OFFICE.

WILLIAM Q. MASTIN, OF OSWEGO, NEW YORK.

COMPOSITION FOR USE IN SMELTING IRON AND OTHER ORES.

SPECIFICATION forming part of Letters Patent No. 256,347, dated April 11, 1882.

Application filed January 21, 1882. (No specimens.)

*To all whom it may concern:*

Be it known that I, WILLIAM Q. MASTIN, a citizen of the United States of America, residing at Oswego, in the county of Oswego and State of New York, have invented certain new and useful Improvements in Compositions for Use in Smelting Iron and other Ores; and I do hereby declare the following to be a full, clear, and exact description of the invention, such as will enable others skilled in the art to which it appertains to make and use the same.

This invention consists in a new composition of matter to be used in the process of smelting ores of iron and other metals.

The said composition is a mixture of the following ingredients in the proportions hereinafter stated: caustic soda, one pound; limestone, two pounds; soda-ash, three-fourths of a pound; charcoal, one-fourth of a pound. These ingredients are ground together, and the mixture, in a pulverized or flour-like state, is ready for use. When applied in a furnace its finely-divided condition allows it to be spread evenly throughout the entire furnace, so that it can act equally on the ore in all parts thereof. The limestone, soda-ash, and caustic soda become a very efficacious flux. They disintegrate the slag formed within the furnace and purify the metal. The intimate mixture of the charcoal with the above-mentioned ingredients insures the immediate application of heat to all their particles by the combustion of said charcoal.

I find that the proportions stated above are the right ones to effect the best results. I also find that the pulverized state of the composition allows it to act more efficaciously than would otherwise be possible.

I do not claim broadly as new a composition consisting of the ingredients named, nor the use thereof as a flux, except in the specific proportions described and claimed; but What I do claim, and desire to secure by Letters Patent, is—

A composition for use in the process of smelting metallic ores, consisting of the following ingredients in the proportions stated: caustic soda, one pound; limestone, two pounds; soda-ash, three-fourths of a pound, and charcoal, one-fourth of a pound.

In testimony whereof I affix my signature in presence of two witnesses.

WILLIAM Q. MASTIN.

Witnesses:
 F. E. HAMILTON,
 G. W. BELL.